US007126907B2

(12) United States Patent  (10) Patent No.: US 7,126,907 B2
Carpini et al.  (45) Date of Patent: Oct. 24, 2006

(54) LABEL SWITCHED COMMUNICATION NETWORK, A METHOD OF CONDITIONING THE NETWORK AND A METHOD OF DATA TRANSMISSION

(75) Inventors: Walter Joseph Carpini, Stittsville (CA); Barry Ding Ken Mark, Kanata (CA); Angelica Grace Emelie Kasvand Harris, Kanata (CA)

(73) Assignee: Tropic Networks Inc., Kanata (CA)

( * ) Notice: Subject to any disclaimer, the term of this patent is extended or adjusted under 35 U.S.C. 154(b) by 978 days.

(21) Appl. No.: 09/943,005

(22) Filed: Aug. 31, 2001

(65) Prior Publication Data

US 2003/0043792 A1  Mar. 6, 2003

(51) Int. Cl.
*H04L 1/22* (2006.01)
(52) U.S. Cl. .................................. 370/218; 370/395.5
(58) Field of Classification Search ............. 370/395.1, 370/360, 469, 389, 351, 357
See application file for complete search history.

(56) References Cited

U.S. PATENT DOCUMENTS

| 4,999,829 | A | * | 3/1991 | Fite et al. ..................... 370/218 |
| 5,058,105 | A | * | 10/1991 | Mansour et al. ............. 370/228 |
| 5,548,639 | A | * | 8/1996 | Ogura et al. ........... 379/221.04 |
| 6,047,331 | A | * | 4/2000 | Medard et al. .............. 709/239 |
| 6,141,319 | A | * | 10/2000 | Dighe et al. ................. 370/218 |
| 6,215,765 | B1 | * | 4/2001 | McAllister et al. ......... 370/217 |
| 6,466,985 | B1 | * | 10/2002 | Goyal et al. ................. 709/238 |
| 6,628,649 | B1 | * | 9/2003 | Raj et al. .................... 370/360 |
| 6,813,242 | B1 | * | 11/2004 | Haskin et al. ............... 370/229 |
| 6,882,627 | B1 | * | 4/2005 | Pieda et al. .................. 370/248 |
| 2002/0112072 | A1 | * | 8/2002 | Jain ............................. 709/239 |
| 2002/0133756 | A1 | * | 9/2002 | Jain ............................... 714/43 |
| 2002/0186658 | A1 | * | 12/2002 | Chiu et al. ................... 370/237 |
| 2004/0213221 | A1 | * | 10/2004 | Civanlar et al. ............. 370/389 |

OTHER PUBLICATIONS

New approaches to service restoration in MPLS-based networks Bartos, R.; Raman, M.; Gandhi.*
An efficient recovery mechanism for MPLS-based protection LSP Sangsik Yoon; Hyunseok Lee; Deokjai Choi; Youngcheol Kim; Gueesang Lee; Lee, M.*
"RSVP Label Allocation for Backup Tunnels"; R. Goguen, G. Swallow; pp. 1-8; Nov. 2000; Draft Memo from Internet; http://www.watersprings.org/links/mlr/id/draft-swallow-rsvp-bypass-label-01.txt.
"Extensions to RSVP-TE for MPLS Path Protection"; V. Sharma, S. Makam, K. Owens, B. Mack-Crane, C. Huang, B. Akyol; pp. 1-12; Nov. 2000; Draft Memo from Internet; http://search.ietf.org/internet-drafts/draft-chang-mpls-rsvpte-path-protection-ext-01.txt.

(Continued)

*Primary Examiner*—Hassan Kizou
*Assistant Examiner*—Salman Ahmed
(74) *Attorney, Agent, or Firm*—Victoria Donnelly

(57) ABSTRACT

A communication network is provided having source and destination switching routers connected by two different communication paths. A primary label switched path is established on one of the communication paths and a secondary label switched path is established on the other label switched path. The source switching router can be enabled to place one or more data flows within the primary label switched path and can be enabled to place one or more of the same data flows within the secondary label switched path. The destination switching router stores a label identifying each data flow and a forwarding instruction and can be enabled to reference data carried within the primary or secondary LSP with the appropriate data flow label.

15 Claims, 7 Drawing Sheets

OTHER PUBLICATIONS

"Framework for MPLS-based Recovery" V. Sharma, B. Mack-Crane, S. Makam, K. Owens, C. Huang, F. Hellstrand, J. Weil, L. Andersson, B. Jamoussi, B. Cain, S. Civanlar, A. Chiu; pp. 1-32; Mar. 2001; Draft Memo from Internet; http://www.ietf.cnri.reston.va.us/internet-drafts/draft-ietf-mpls-recovery-frmwrk-02.txt.

"A Path Protection/Restoration Mechanism for MPLS Networks"; K. Owens, S. Makam, V. Sharma, B. Mack-Crane, C. Huang; pp. 1-8; Nov. 2000; Draft Memo from Internet; http://search.ietf.org/internet-drafts/draft-chang-mpls-path-protection-02.txt.

"Analysis of the similarities and differences between the two primary MPLS label distribution protocols: RSVP and CR-LDP"; P. Brittain, A. Farrel; pp. 1-25; Jan. 7, 2000; Data Connection Limited.

* cited by examiner

LABEL SWITCHED COMMUNICATION NETWORK, A METHOD OF CONDITIONING THE NETWORK AND A METHOD OF DATA TRANSMISSION

FIELD OF THE INVENTION

The present invention relates to a label switched communication network, and in particular to a system and method for controlling the flow of data over a communication network.

BACKGROUND OF THE INVENTION

A typical communication network comprises a number of nodes interconnected by communication links, forming communication paths between different nodes on the network. Communication signals are routed over the network from a source node to a predefined destination node over a path which may include a number of nodes and links. Information defining the particular path to be taken and the destination may be carried with the data, for example in a packet header which is read at each node and controls a router at each node to direct the data along the next appropriate communication link of the specified path. This method of data transmission may be referred to as tag or label switching, of which asynchronous transfer mode (ATM) is a well-known example and another is multi-protocol label switching (MPLS) which has been proposed more recently.

For each working path of a communication network, the provision of a second alternative path is normally required which is able to carry the data traffic intended for the working path to the predefined destination node in the event that the transmission capability of the first communication path becomes impaired, for example due to excessive traffic density or a fault or failure in the data transmission capability of the working path.

A physical path between two nodes on a network, for example between an ingress label ledge router (LER) and an egress label edge router may carry a large number of label switched paths (LSP's) (e.g. a thousand or more). Each label switched path has a unique labelling system which enables the common destination node at which the LSPs terminate to uniquely identify data associated with each LSP and to forward the data according to the LSP with which the data is associated. In order to simplify the processing required by each label switching router (LSR) in transmitting data of different LSPs along the working path, the multiple LSPs may be aggregated into a single LSP so that all LSPs using the same working path are treated by the intermediate LSRs between the source and destination nodes as one LSP. In one implementation of this system, a single LSP is set up between the source node and the destination node. Data output from the source node includes both a label associated with its particular LSP, which is to be read by the destination node, and a higher level label which is common to all LSPs and which identifies the data in each LSP as belonging to the common, aggregate LSP. The intermediate LSRs are programmed only to read the higher level labels associated with the aggregate LSP and to ignore the lower level labels associated with each individual LSP, which propagate, unchanged along the working path to the destination node. In this way, the LSP forwarding table at each intermediate LSR is simplified and the processing time at each LSR therefore reduced as different LSPs are effectively seen and treated as a single LSP.

To protect traffic flow against a fault or failure in transmission along the primary path between the source and destination nodes, a secondary path between the source and destination nodes is provided, and in the event of a fault, the data flow is switched by the source node from the primary path to the secondary path. Typically, for each LSP carried on the primary path between the source and destination nodes, a secondary LSP is established for the secondary path. In the case of protection, each secondary LSP is set up before a fault occurs on the primary path, and in the case of restoration, each secondary LSP is set up after a fault occurs on the primary path. The labelling system associated with each secondary LSP is unique between different secondary LSPs and all of the primary LSPs to enable the destination node to uniquely identify each secondary LSP as acting as a secondary LSP for a particular primary LSP. Thus, whether the secondary path is used for protection or restoration, the source node must contain both a first forwarding table containing labels for each primary LSP and a second forwarding table containing labels for each secondary LSP.

One particular drawback of this known system is the time required to set up the secondary LSPs, which increases with the number of LSPs carried on the primary path, each of which requires a secondary LSP to be dialled over the secondary path. This problem may become particularly severe when invoking a path restoration scheme which may involve establishing (or dialling) many, for example a thousand or more secondary LSPs when a failure occurs on the primary path. Although such a restoration scheme may be practical for small numbers of LSPs, the time required to complete restoration for large numbers of LSPs may be unacceptable, and therefore such a scheme is not particularly scalable.

A number of path restoration schemes have been proposed and published by the Internet Engineering Task Force and are available on their web site at www.ietf.com. These include "A Path Protection/Restoration Mechanism for MPLS Networks," Ken Owens et al; "Extensions to RSVP-TE for MPLS Path Protection," Vishal Sharma, and "Framework for MPLS-based Recovery," Vishal Sharma et al. However, none of these proposed approaches addresses the scalability concerns mentioned above.

SUMMARY OF THE INVENTION

According to one aspect of the present invention, there is provided a communication network comprising a first switching router and a second switching router, first and second communication paths extending between the first and second switching routers, the second communication path including at least one communication path element different from the first communication path, first enabling means for enabling the first switching router to output predetermined data for transmission to the second switching router onto the first communication path with a flow label and a first communication path label, and second enabling means for enabling the first switching router to output the predetermined data for transmission to the second switching router onto the second communication path with the flow label and a second communication path label, the second switching router having a flow label and an instruction both corresponding to the flow label, and, if the data is carried on the first communication path, the second switching router being capable of matching the flow label carried with the data with the corresponding flow label, and, if the data is carried on the second communication path, the second switching router being capable of matching the flow label carried with the data with said corresponding flow label.

In this arrangement, the first switching router is adapted or configured, when enabled by the first enabling means to route predetermined data for transmission to the second switching router along the first communication path, and is adapted or configured when enabled by the second enabling means to route the predetermined data along the second communication path. In one embodiment, at least one of the first and second enabling means may comprise an instruction which adapts or configures the first switching router to perform the specified function. The instruction may be stored for example in the first switching router and activated when required, and disabled when not required. When the first switching router is enabled by the second enabling means, data which is output from the first switching router or node element onto the second communication path, which may be used for protection or restoration, includes both a flow label which is readable by the second switching router, and corresponds to an instruction associated with the data and held at the second switching router, and a path identification label which identifies the path between the first and second switching routers along which the data is to be transmitted. Advantageously, the flow label output with the specified data onto the secondary path can be the same as that for routing with the specified data on the primary path, and since this label is not path dependent, the first switching router is not required to change or transform this label when the specified data is output onto the secondary path, for example, on restoration of data transmission due to a fault on the primary path. Thus, whereas in the prior art schemes, the router responsible for switching data onto the protection path is required to store a second set of labels associated with each secondary LSP and to change to the secondary LSP labels on restoration, the present scheme employs the same instruction label for both paths, avoiding the need for storing a second set of LSP labels and for processing the table during path restoration.

The second switching router holds an instruction corresponding to the flow label and is adapted to correlate the flow label received with the specified data to the appropriate instruction whether the specified data is received from the first communication path or the second communication path. In one embodiment, this may be achieved if the flow label is unique to the second switching router, or is unique to an interface port of the second switching router and both the first and second communication paths terminate at that interface port. In another embodiment, where the flow label is unique to an LSP but not to the second switching router, the flow label and the corresponding instruction for data arriving at the primary path interface may be duplicated or otherwise made available to the interface for receiving data from the secondary path.

The second communication path label which is output with data from the first switching router onto the second communication path operates as a label in defining the secondary label switched path between the first and second switching routers. The labelling system for the secondary path may be established during path set-up which, if used for protection, is set up prior to the occurrence of a fault or failure in the primary path or, for restoration, after the occurrence of a fault on the primary path. In order to output data intended for transmission to the second switching router onto the secondary path, the addition of the secondary path LSP label is simply required, whereas the flow label for the specified data remains unchanged. Thus, regardless of the number of different flow labels associated with data for transmission to the second switching router, only a single operation of adding a single, common label to all data is required. Therefore, to protect or restore data transmission between two nodes, the present communication network only requires a single LSP to be established on secondary path rather than an LSP for each flow label or data flow, providing a significant reduction in restoration time and a fully scalable protection or restoration scheme.

According to another aspect of the present invention, there is provided a method of conditioning a communication network for transmitting data from a first node to a second node of the network, in which the network includes first and second communication paths between the first and second nodes, the method comprising the steps of: (a) establishing an instruction for execution at the second node in respect of data which is to be transmitted from the first node to the second node, establishing a flow label corresponding to the instruction for transmission with the data from the first node to the second node, and storing the instruction and the corresponding flow label at the second node, (b) establishing a first communication path label for outputting with data from the first node onto the first communication path, (c) establishing a second communication path label for outputting with data from the second node onto the second communication path, and (d) conditioning the first node to include the flow label with the data to be transmitted to the second node, and to include the first communication path label with the data if the data is to be transmitted along the first communication path, and to include the second communication path label with the data if the data is to be transmitted along the second communication path.

According to another aspect of the present invention, there is provided a method of transmitting data from a first node to a second node on a communication network which includes first and second communication paths between the first and second nodes, the method comprising the steps of: (a) labelling data for transmission to the second node with a flow label for enabling the second node to execute an instruction associated therewith, (b) labelling said data with a first communication path label for transmitting data along the first communication path, (c) outputting from the first node data onto the first communication path with the flow label and the first communication path label, (d) in response to a signal, labelling data for transmission to the second node with a flow label for enabling the second node to execute the instruction, (e) labelling the data with a second communication path label for transmitting data along the second communication path, (f) outputting data onto the second communication path with the flow label included with data in step (d), and the second communication path label.

According to another aspect of the present invention, there is provided a router for routing data onto a network having a network node and first and second communication paths extending from the router to the network node, the router comprising first enabling means for enabling the router to route data for transmission to the network node onto the first communication path with a flow label to enable the network node to perform a forwarding operation on the data, and with a first communication path label, and second enabling means for enabling the router to route data for transmission to the network node onto the second communication path with a flow label to enable the network node to perform the operation on the data, and with a second communication path label.

According to another aspect of the present invention, there is provided a router for receiving data from a first and second communication path, comprising: reading means for reading a communication path label and a flow label received with data from the first and second communication paths, a memory storing a flow label and a corresponding forwarding instruction to enable the router to forward data having the stored flow label, and comparing means for comparing a flow label received with data on the first or second communication path with the stored flow label if the data and the received flow label is received with one of the first and second communication path labels.

BRIEF DESCRIPTION OF THE DRAWINGS

Examples of embodiments of the present invention will now be described with reference to the drawings, in which.

DESCRIPTION OF EMBODIMENTS

Figure 1A:
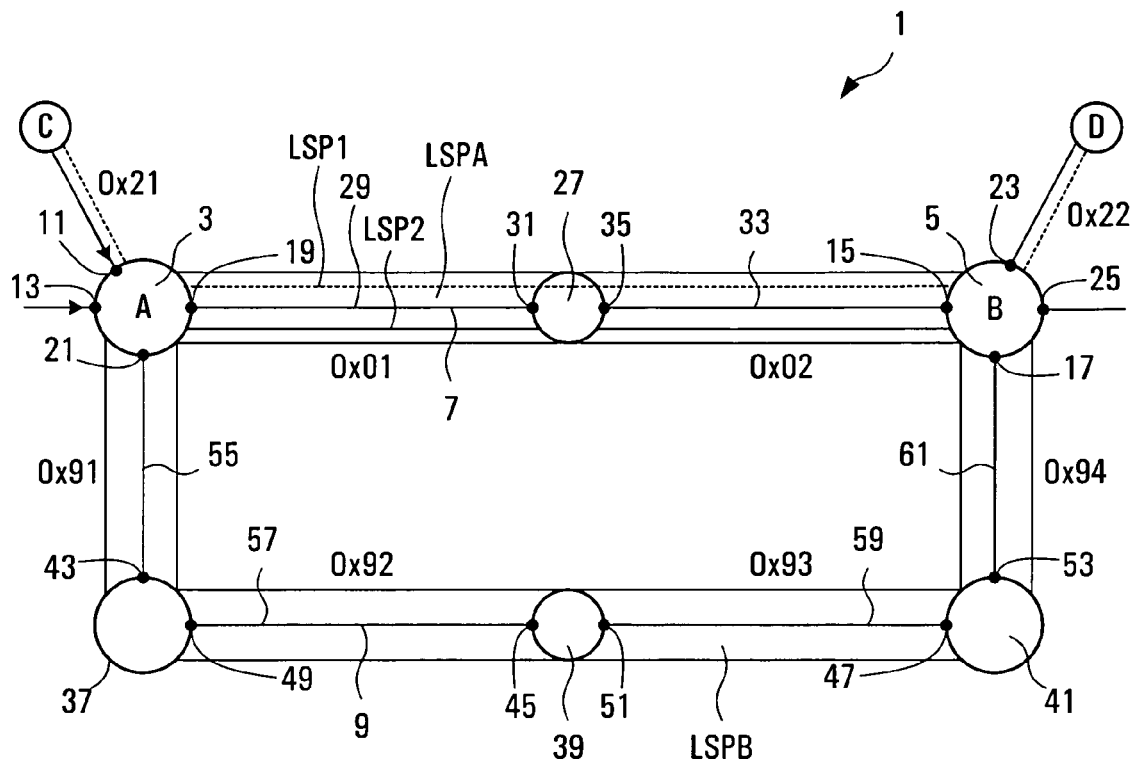
FIG. 1A shows a communication network in accordance with an embodiment of the present invention in a first mode of operation.
Figure 1B:
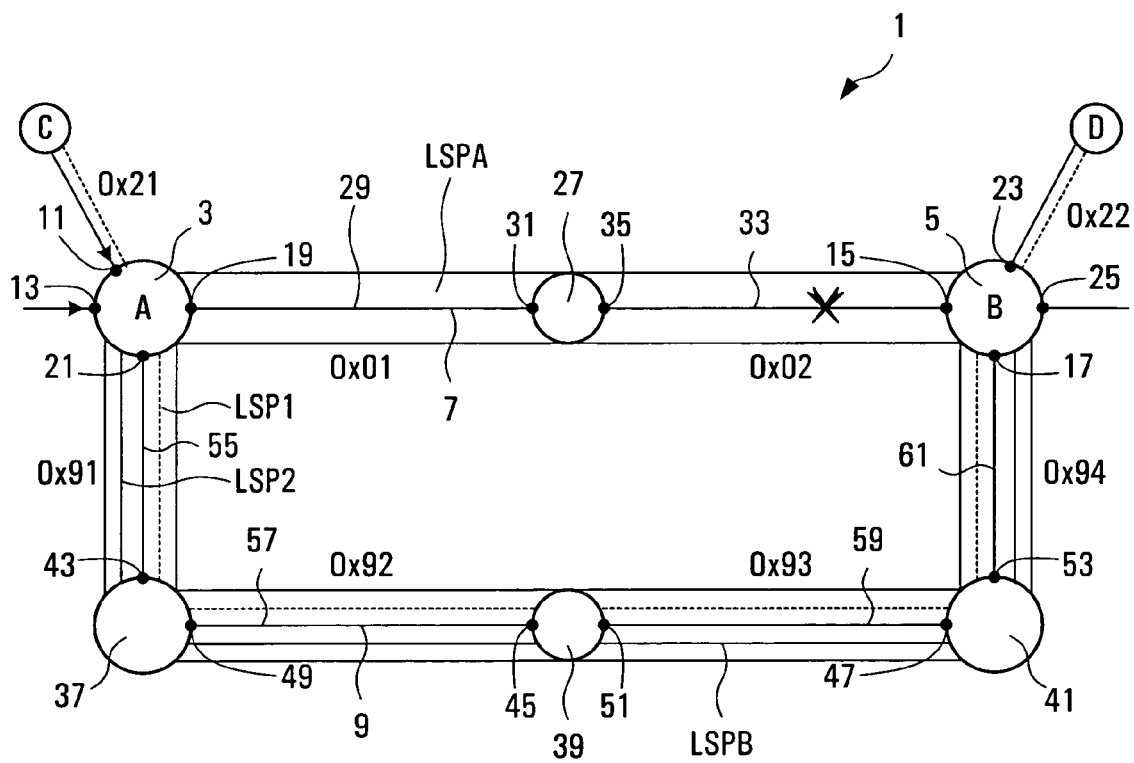
FIG. 1B shows the communication network shown in FIG. 1A in a second mode of operation.

Referring to FIG. 1, a communication network, in accordance with an embodiment of the present invention, and generally shown at 1, comprises a first switching router 3 at node A, a second switching router 5 at node B and first and second communication paths 7, 9 extending between the first and second switching routers 3, 5. Each of the first and second switching routers 3, 5 has a plurality of input ports 11, 13, 15, 17 and a plurality of output ports 19, 21, 23, 25. The first communication path 7 includes an intermediate switching router 27, a communication link 29 connected from an output port 19 of the first switching router to an input port 31 of the intermediate switching router 27, and a second communication link 33 connected from an output port 35 of the intermediate switching router 27 to an input port 15 of the second switching router 5. The second communication path 9 includes a plurality of intermediate switching routers 37, 39, 41 each having an input port 43, 45, 47 and an output port 49, 51, 53. The second communication path further includes a respective communication link 55, 57, 59, 61 extending from a respective output port 21, 49, 51, 53 of the first and intermediate switching routers to a respective input port 43, 45, 47, 17 of their respective adjacent switching router.

Figure 2:
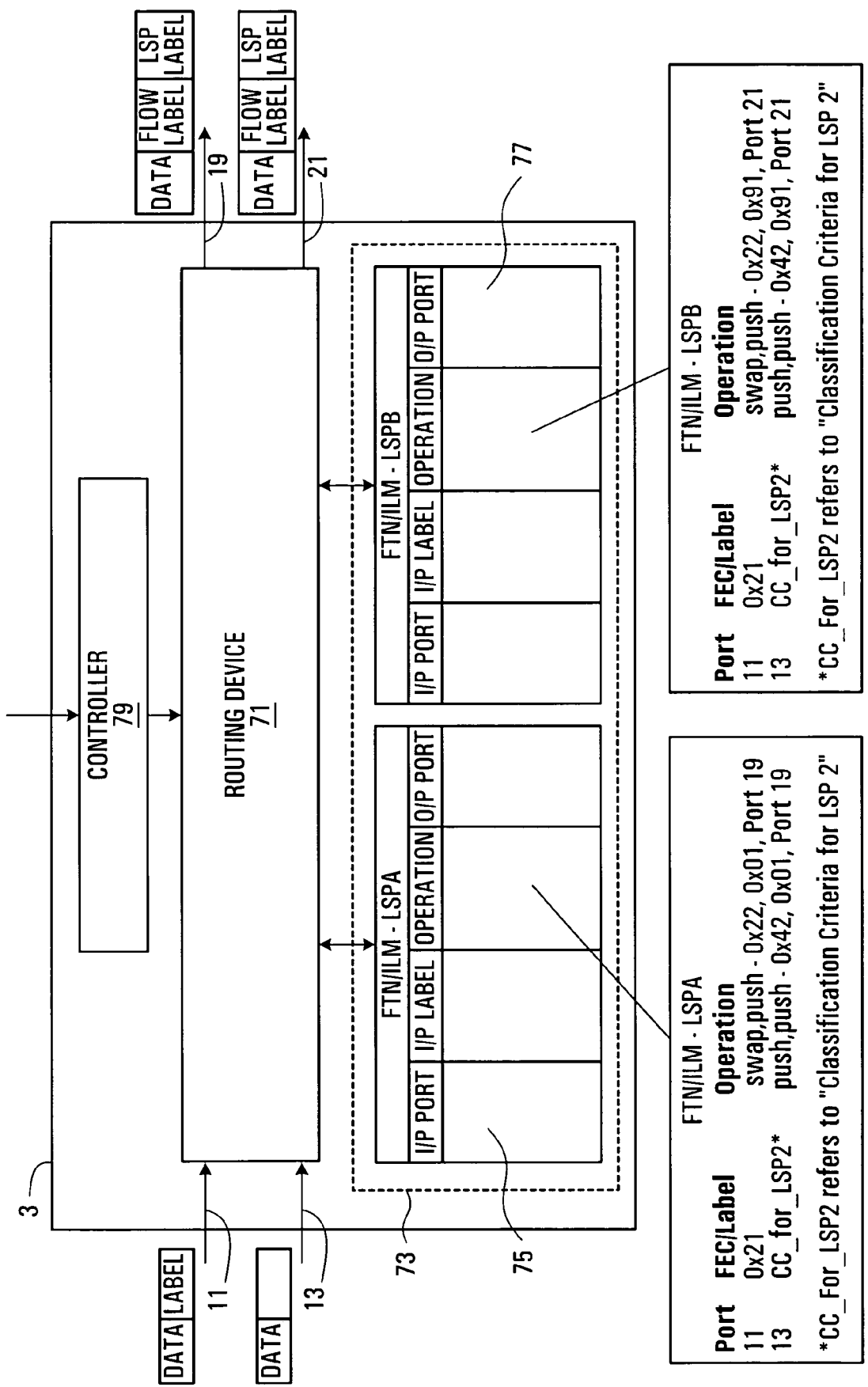
FIG. 2 shows a schematic diagram of a first switching router according to an embodiment of the present invention.

FIG. 2 shows a schematic diagram of an embodiment of the first switching router 3 in more detail. Referring to FIG. 2, the first switching router 3 comprises a routing device 71 having data input ports 11 and 13, and data output ports 19 and 21. The first switching router further includes a memory 73 for storing one or more incoming label map(s)(ILM) 75, 77 which may also be referred to as a forwarding table, and a controller 79 for controlling the routing device 71.

Figure 3:
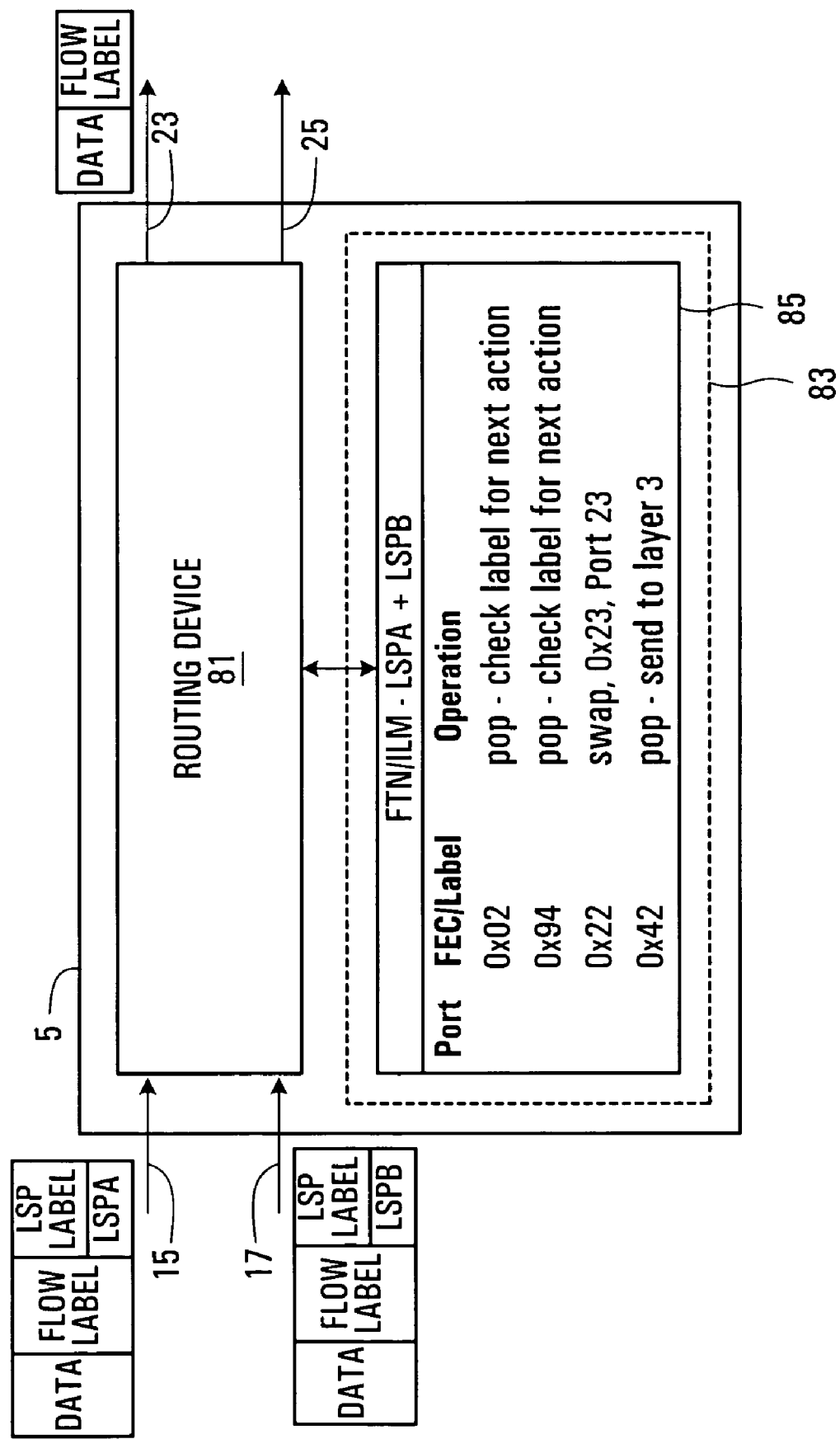
FIG. 3 shows a schematic diagram of a second switching router according to an embodiment of the present invention.

FIG. 3 shows a schematic diagram of an embodiment of the second switching router 5 in more detail. The second switching router 5 comprises a routing device 81 having data input ports 15 and 17 and data output ports 23 and 25 and a memory 83 for storing one or more incoming label map(s) (or forwarding tables) 85.

Examples of the steps involved in conditioning the first and second switching routers and their operation to switch data packets from the first communication path to the second communication path will be now described.

In one general embodiment, the method includes the following steps:

(a) create a primary label switched path (LSP) on a first communication path between first and second nodes (switching routers);

(b) place one or more data flows which flow from the first to the second node on the first communication path within the primary LSP;

(c) create a secondary LSP on a second communication path between the first and second nodes;

(d) transfer information or knowledge of the data flow(s) placed within the primary LSP into the secondary LSP;

(e) transport data traffic of each data flow associated with the primary LSP in the secondary LSP.

Examples of each of these steps will now be described in more detail with reference to FIGS. 1A to 3.

A primary label switched path (LSPA) is established between the first and second switching routers 3, 5 over the first communication path 7. This involves establishing a data packet labelling system between the various switching routers 3, 27, 5 forming the first communication path and from which each switching router can identify data packets as belonging to the primary label switched path. The primary label switched path may be created using any suitable path set up signalling method, examples of which include CR-LDP (Constraint-Based LSP Setup Using Label Distribution Protocol) and RSVP-TE (Resource Reservation Protocol-Traffic Engineering, also known as Extensions to RSVP for LSP Funnel(s)). In this particular example, the data packet labels defining the primary label switched path are "0×01" between the first switching router 3 and the intermediate switching router 27, and "0×02" between the intermediate router 27 and the second switching router 5.

In this embodiment, the first switching router serves as the source node or ingress label edge router (LER) of the primary LSP and the second switching router serves as the destination node or egress label edge router of the primary LSP.

After the primary LSP has been established, the first switching router 3 is conditioned to place or group one or more data flows destined for the second switching router within the primary LSP. Generally a data flow refers to a flow path on a communication network for specified data. Different flow paths may originate at the same or different nodes or points on the network and terminate at the same or different nodes or points on the network, and at least part of one flow path may have the same nodes and links as another flow path. In the present embodiment, one or more flow paths include the first and second switching routers and the first communication path therebetween. A data flow which is placed in the primary LSP may originate at node A or from another point on the network and terminate at node B or at another point on the network. A flow path may itself be an LSP and may be referred to as a micro flow when aggregated within another LSP.

Different data flows are distinguished from one another by different labels which are established between the first and second switching routers 3, 5. The first switching router 3 is adapted to tag data packets specified for a particular data flow with a label which identifies that data flow. The label identifying each data flow is used by the second switching router to determine the next operation to be applied to data packets tagged with that label. A copy of each data flow label is stored in memory at the second switching router with a corresponding instruction, for example a data packet forwarding instruction, which is to be executed by the second switching router. Where the data flow labels are used by the second switching router to forward data packets to the appropriate forwarding address, they function as LSP forwarding labels. For example, the flow label may have a corresponding instruction which causes the second switching router to forward data packets to the next node of the LSP or to forward data packet(s) to a different layer, for example a control layer.

In general, a data flow label is used by the second switching router to execute an instruction or instructions on data packets within the flow and henceforth will be referred to as a flow label.

Therefore, in grouping different data flows, the first switching router determines which data flows, either received or originating at the first switching router are to be grouped or aggregated within the primary LSP and generates a corresponding map or table specifying the selected data flow label(s).

FIG. 2 shows an example of an incoming label map 75 (ILM) stored in the first switching router containing two data flows to be grouped within the primary LSP. In this example, the first data flow is an LSP (LSP1 shown in FIG. 1A) which is defined by a communication path which includes nodes C, A, B and D, and the second is another LSP (LSP2 shown in FIG. 1A) defined by the first communication path from node A to node B. The first label map entry identifies an incoming data flow (LSP1) on port 11 labelled "0x21", and the second entry specifies that the classification criteria for a specified data flow (i.e. LSP 2) between the first and second switching routers is to be applied to all incoming data received at port 13. The second table entry exemplifies a data flow for data packets transmitted directly to the first switching router by a user (e.g. from CPE (Customer Premises Equipment), a Router or Ethernet Switch).

The table specifies an operation corresponding to each entry, each containing forwarding instructions to be applied by the first switching router to the designated incoming data packets. In this particular example, the operation for the first entry applies to incoming data packets labelled "0x21", and forwarded from node C and causes the incoming data label "0x21" to be replaced by the flow label "0x22", the primary LSP label "0x01" to be added to the data packets, and the data packets to be output from port 19. The operation for the second entry applies to data packets received at port 13 and specifies adding to data packets received at port 13 an instruction label "0x42", and the first primary LSP label "0x01", and to output the data packets from port 19.

An incoming label map containing instructions for incoming data flows contained within the primary LSP is established at the second switching router 5. An example of this incoming label map is shown in FIG. 3. Referring to FIG. 3, the incoming label map specifies the port of the second switching router at which data packets transmitted on the primary LSP are received, the labels associated with the data packets and the operation to be performed on the data packets by the second switching router. The first entry of the ILM table specifies the primary LSP label "0x02", used to identify the primary LSP between the intermediate switching router 27 and the second switching router 5, and an associated operation which causes the second switching router to remove the primary LSP label and read the next label. The third and fourth entries of the ILM include the instruction labels "0x22" and "0x42", respectively, which are added to the appropriate data packets by the first switching router, and operations associated with each instruction label. In this example, the operation associated with the instruction label "0x22" is applied to data packets labelled "0x22" and causes the switching router to replace the instruction label with a different instruction label "0x23" and to output the data packet with this new instruction label from port 23 of the second switching router. The operation associated with the instruction label "0x42" is applied to data packets labelled "0x42" and causes the second switching router to remove the instruction label and send the data packet to layer 3.

In operation, the routing device 71 of the first switching router reads labels associated with incoming data received at port 11 and performs the appropriate operation on the incoming data as specified in the ILM 75. For incoming packets labelled with the flow path label "0x21", the routing device 71 replaces this label with the flow path label "0x22", adds the first primary LSP label "0x01" and outputs the data packets from port 19 onto the first communication path 7 to the intermediate switching router 27. The intermediate switching router 27 is adapted to read the primary LSP label "0x01", to replace this label with the second primary LSP label, "0x02" and to output the data packets onto the next communication link of the first communication path to the second switching router 5. It is to be noted that the intermediate switching router is arranged to ignore the flow path label "0x22", which therefore passes or "tunnels" through the intermediate switching router 27 with the data packets and remains unchanged. Likewise, the routing device 71 of the first switching router operates on incoming data received at port 13 by adding the flow path label "0x42" and the first primary LSP label "0x01" and outputting the data packets from port 19 onto the first communication path 7 to the intermediate switching router 27. Again, the intermediate switching router reads the primary LSP label "0x01", and replaces the label with the second primary LSP label "0x02" and outputs the data packets onto the next communication link of the first communication path from its output port 35. Again, the intermediate switching router is adapted to ignore the flow path label "0x42" associated with the data packets, which therefore passes through the intermediate switching router unchanged. Thus, both data flows LSP1 and LSP2 see node B as the next node adjacent to node A, and do not see the intermediate node 27 (or any other intermediate nodes). Therefore, even though there may be one or more intermediate nodes between node A and node B the path from A to B constitutes a single hop of the data flows. Thus, for each data flow aggregated within the primary LSP, the primary LSP functions as a "virtual trunk" of which a Forwarding Adjacency LSP (FA-LSP) is an example.

The routing device 81 of the second switching router reads the labels associated with incoming data and operates on the data packets in accordance with the operations specified in the incoming label map 85. In one embodiment, the routing device is adapted to identify the primary LSP label received with incoming data packets, locate the relevant entry in the ILM by comparing the received LSP label with the labels contained in the ILM, and executes the instruction associated with the primary LSP. Where the second switching router serves as an egress LER for the primary LSP, the instruction typically includes an instruction to remove the primary LSP label. The instruction also typically includes an instruction to read the flow label received with the data. In response to this latter instruction, the routing device identifies the flow label received with the incoming data, locates the relevant entry in the ILM by comparing the received flow label with the labels contained in the ILM, and executes the instruction associated with the flow label.

In one embodiment, the routing device is adapted to identify the LSP label according to the ordering of the LSP and flow labels received with the data packet. For example, as shown in FIG. 2, the LSP label is ordered first (and therefore received first) and the flow label is ordered second (and therefore received second) although in other embodiments, the flow label may be ordered first and the LSP label ordered second, while in other embodiments, the data and label may be ordered in any other way.

When all data flows on the first communication path are aggregated within the primary LSP, the second switching router may be adapted simply to ignore or remove the primary LSP label, whose function is to direct the data packets of each flow to the second switching router, this function being completed once the data packets are received by the second switching router. In other embodiments, the router preceding the second switching router (i.e. the destination router for the primary LSP) need not apply a primary LSP label to outgoing data packets, since the flow labels associated with the data packets may be sufficient to match the data flows with the corresponding ILM instructions at the second switching router.

However, where not all data flows on the first communication path are aggregated within the primary LSP, for example, there may be data flows aggregated in one or more other LSPs and/or more individual, non-aggregated flow(s) on the first communication path, or where there are other flows received on the same port of the second switching router which receives primary LSP data flows, the LSP label serves to distinguish data aggregated on the primary LSP from other data flows. This enables the second switching router to identify uniquely the primary LSP data, which may be necessary if one or more flows within the primary LSP has the same flow label as one or more flows external of the primary LSP. In this case, the primary LSP label enables the second switching router to identify uniquely those flow labels for the primary LSP data flows and their associated instructions.

Any number of data flows may be grouped within the primary LSP and the incoming label map of the first and second switching routers contains an entry for each data flow. As new data flows are created and grouped within the primary LSP, the data flows are added to the incoming label maps of both the first and second switching routers. Similarly, if data flows specified in the incoming maps become redundant, for example, as indicated by the absence of a refresh message for a predetermined period of time, their corresponding entry is deleted from the incoming label maps. In one embodiment, the second switching router tracks all data flows within the primary LSP and regularly updates its incoming label map.

Next, an example of a method of establishing a secondary label switched path between the first and second switching routers will be described. The secondary LSP may be established at any time, for example before, during or after the primary LSP is established. Generally, if the secondary LSP is for the purpose of protecting the primary LSP, the secondary LSP is established prior to the occurrence of a fault on the first communication path, for example at about the same time as the primary LSP is being established, and if the purpose of the secondary LSP is to restore primary LSP traffic, the secondary LSP is established after the occurrence of a fault on the first communication path.

Referring again to FIGS. 1A to 3, a secondary LSP (LSPB) is established between the first and second switching routers over the second communication path 9. A data packet labelling system is established between the switching routers 3, 37, 39, 41, 5 forming the secondary communication path which defines the secondary LSP and distinguishes data packets flowing in the secondary LSP from any other data packets transmitted on the second communication path. In the example shown in FIG. 1, the forwarding label "0×91" defines the secondary LSP between the first switching router 3 and the next, secondary path switching router 37, and forwarding labels "0×92", "0×93" and "0×94" define the secondary LSP between the next successive switching routers 37, 39, 41, 5 of the second communication path 9. As for the primary LSP, any suitable signalling method may be used to create the secondary LSP, including CR-LDP and RSVP-TE.

The first switching router is conditioned so that the secondary LSP can serve as an alternative path for the data flows grouped or stacked within the primary LSP. This involves making the information concerning the different data flows contained in the incoming label map for the primary LSP available for the secondary LSP. The process of making this information available to the secondary LSP may commence either before during or after the secondary LSP has been established.

One method of transferring the data flow information from the primary LSP incoming label map to the secondary LSP is to generate, and transfer the information into a second incoming label map for the secondary LSP, for example as shown in FIG. 2. In generating the secondary LSP label map, the primary LSP forwarding label for each entry is replaced by the secondary LSP forwarding label and the identity of the outlet port of the second communication path is changed as necessary (i.e. if the outlet ports for the first and second communication path are different as in the present example). Referring to the example of the incoming label map for the secondary LSP shown in FIG. 2, for each entry, the primary LSP forwarding label "0×01" is replaced by the secondary LSP forwarding label "0×91" and the identity of the outlet port has been changed from port 19 to port 21.

In the process of conditioning the first switching router for restoration by switching data traffic from the primary to the secondary LSP, it is particularly beneficial to generate the secondary LSP incoming label map at the earliest opportunity. For example, the label map for the secondary LSP may be generated in parallel with the creation of the secondary LSP, e.g. before the creation of the secondary LSP has been completed. For example, information concerning the secondary LSP can be updated for each entry in the secondary LSP incoming label map as soon as the first forwarding label of the secondary LSP has been established.

In one embodiment, the primary LSP label map is maintained after data traffic is switched from the primary to the secondary LSP for use when data traffic is switched back from the secondary LSP to the primary LSP. Preferably, as new data flows are added or removed from the primary LSP, both the primary and secondary LSP label maps are updated.

In an alternative embodiment, the secondary LSP incoming map may be generated simply by overwriting the relevant information in the primary LSP label map, in which case the primary LSP label map is not maintained, for example in order to reduce label map storage requirements. However, a record of the first forwarding label for the primary LSP and the output port may be stored, for example in the memory of the first switching router from which the primary LSP incoming label map can be regenerated when switching data traffic back from the secondary LSP to the primary LSP. This single incoming label map is preferably updated as data flows are added and removed.

Before the secondary LSP is invoked to carry data traffic, it may be necessary to condition the second switching router 5 to correlate each data flow contained within the secondary LSP with the corresponding instruction for each data flow as specified in the incoming label map of the primary LSP. This can be achieved in a number of different ways depending how the second switching router is configured, and examples will now be described with reference to FIGS. 3 to 5.

Referring to FIG. 3, both data input ports 15 and 17 which receive data carried on the first and second communication paths 7, 9, respectively are connected to the same routing device 81. A single incoming label map 85 is maintained for the routing device 81 and therefore serves as the incoming label map for all incoming data flows on ports 15 and 17. In this example, each entry contained in the incoming label map established for each data flow in the primary LSP is used for the secondary LSP. The second switching router may be conditioned by signalling the second switching router that the secondary LSP is to be associated with the primary LSP. In response to the signal, a new entry is added to the incoming label map 85 containing the forwarding label which identifies the secondary LSP to the second switching router (which in the present example is "0×94") and the instruction which corresponds to the forwarding label for the primary LSP. Thus, with this single entry addition to the incoming label map, the second switching router is conditioned to handle all data flows whether carried within the primary LSP or the secondary LSP.

The signalling for the second switching router which references the secondary LSP to the primary LSP may be done at any suitable time using any suitable method and by any suitable means. For example, the signalling may originate from the first switching router or from any other suitable source, and may be transmitted to the second switching router via any suitable communication path, for example the first or second communication path. Conveniently, the signalling may be performed at the time the secondary LSP is being established, for example, the signal may be included for example as an extra data field identifying the primary LSP (the primary LSP-ID), with the signalling used to set up the secondary LSP. If an RSVP signalling method is used to set up the secondary LSP, the LSP-ID may be sent as an opaque object i.e. an object which is ignored by any intermediate label switching routers (LSRs), or if a CR-LDP signalling method is used to set up the secondary LSP, the LSP-ID may be included as an opaque TLV (Type Length Value).

Figure 4:
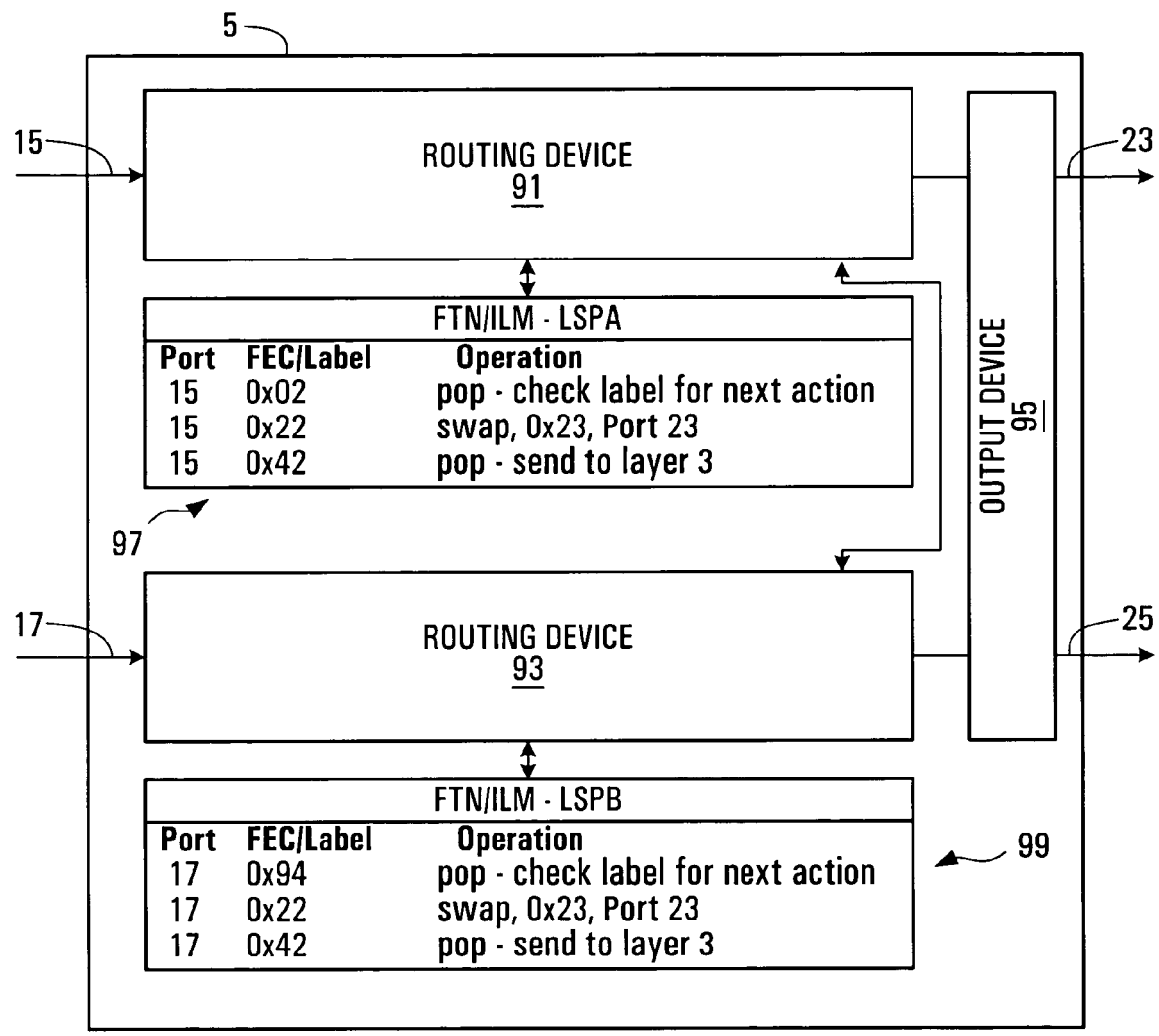
FIG. 4 shows a schematic diagram of another embodiment of a second switching router.

Referring to FIG. 4, another embodiment of a second switching router is shown in which the input port 15 for receiving primary LSP data traffic is connected to a first routing device 91 and the input port 17 for receiving secondary LSP data traffic is connected to a second routing device 93. The second switching router includes an output device 95 for outputting data traffic from the first and second routing devices 91, 93 from the appropriate port 23, 25. In this embodiment, each routing device 91, 93 has an associated incoming label map 97, 99. The incoming label map 97 associated with the first routing device contains entries for each data flow grouped within the primary LSP.

To enable the second routing device 93 to handle the primary LSP data flows when transmitted within the secondary LSP and received at port 17, an appropriate set up signal is transmitted to the second switching router which causes a new entry to be added to the incoming label map 99 associated with the second routing device containing the forwarding label for the secondary LSP and the instruction corresponding to that associated with the forwarding label for the primary LSP contained in the incoming label map 97 associated with the first routing device 91. The set up signalling also causes entries for each data flow within the primary LSP stored in the incoming label map 97 associated with the first routing device to be transferred into the incoming label map 99 associated with the second routing device 93. Once the transfer of entries between the incoming label maps is complete, the second switching router is able to handle the forwarding of data flows whether transmitted within the primary LSP and received at port 15 or transmitted within the secondary LSP and received at port 17.

In one embodiment, each incoming label map 97, 99 may contain entries for other aggregate LSPs and/or individual data flows which use the same port of the routing device with which the incoming label map is associated. In this case each data flow which uses the ILM must use, and the ILM must contain a different flow label for different forwarding instructions, so that each data packet can be correlated with the correct instructions(s).

Preferably, entries in the incoming label map relating to data flows within the primary LSP are regularly updated as data flows are added and removed, and entries for the corresponding data flows contained in the incoming label map which serves the secondary LSP are also updated. Similarly, when the data flows are transported within the secondary LSP, entries in the secondary LSP incoming label map are preferably also regularly updated as data flows are added and removed and corresponding changes are preferably made to the primary LSP incoming label map, so that, for example the ILM for the primary LSP reflects the latest status of data flows for grouping within the primary LSP when the transport of data flow within the primary LSP is resumed.

In another embodiment, the ILM's 97, 99 may contain identical entries and both maps are updated whenever an entry changes. In this case, the primary and secondary LSP labels and the flow labels grouped within the primary and secondary LSP's uniquely identify data arriving at ports 15 and 17 and therefore labels associated with the secondary LSP and its data flows cannot be used by other LSP's or data flows arriving at port 15, and labels associated with the primary LSP and if data flows cannot be used by other LSP's or data flows at port 17, which limits the number of available labels for other LSP's which may arrive on these ports.

In another embodiment, the second switching router may have a single ILM shared between first routing device 91 and the second routing device 93. In this case, the ILM may contain only a single entry for each data flow of the primary and secondary LSP.

Any suitable signalling method may be used to condition the second switching routing shown in FIG. 4 in order to reference primary LSP data flows with secondary LSP data flows and may include any of the set up signalling methods described above in connection with FIG. 3.

In an alternative embodiment, the first and second routing devices shown in FIG. 4 may share the same incoming label map.

Figure 5:
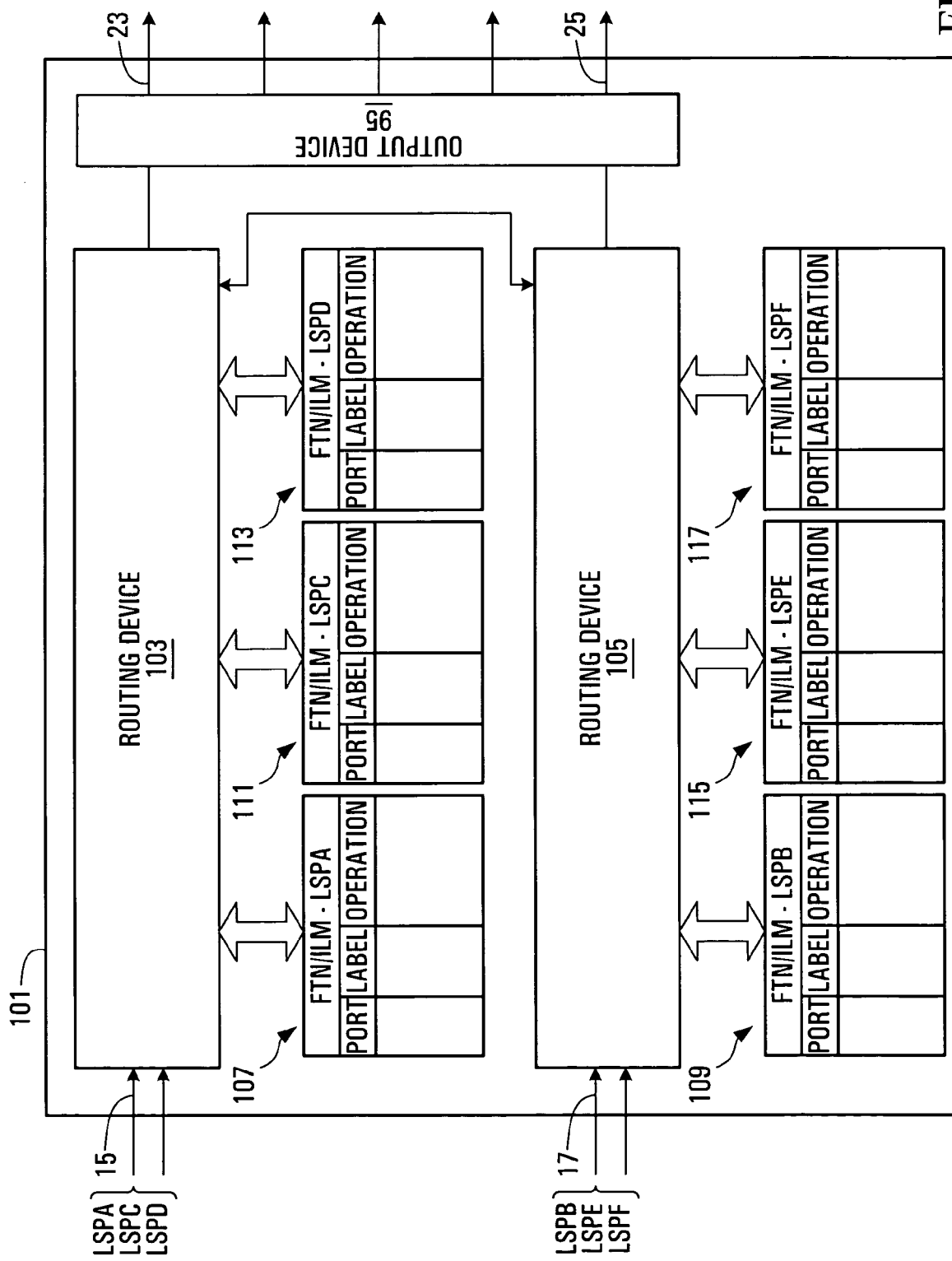
FIG. 5 shows a schematic diagram of another embodiment of a second switching router.

FIG. 5 shows another embodiment of a second switching router which is configured such that each label switched path has its own incoming label map. Referring to FIG. 5, the switching router 101 includes a first routing device 103 having a data input port 15 which is connected to the first communication path and which receives data traffic contained within the primary LSP. The switching router 101 further includes a second routing device 105 having a data input port 17 which is connected to the second communication path and which is for receiving data traffic contained within the secondary LSP. The switching router includes a primary LSP incoming label map 107 associated with the first routing device, which contains flow labels and associated forwarding instructions for each data flow within the primary LSP.

In this embodiment, to condition the switching router 101 to handle data flows contained within the secondary LSP, a discrete incoming label map 109 for the secondary LSP is generated, for example in response to a set up signal received by the switching router. In generating the incoming label map for the secondary LSP, an entry may be included containing the forwarding label defining the secondary LSP which is received by the second switching router, and the instruction corresponding to the forwarding label defining the primary LSP contained within the primary LSP incoming label map 107 or another appropriate instruction. The flow label and corresponding instruction for each data flow contained within the primary LSP label map is also incorporated into the secondary LSP incoming label map 109. Alternatively, the second switching router may contain an instruction external of the ILM 109 instructing the routing device 105 to refer to the secondary LSP ILM 109 in response to receiving the secondary LSP flow label. Once the secondary LSP incoming label map has been generated, the second switching router 101 is able to route data traffic for each data flow whether received within the primary LSP or the secondary LSP.

Any suitable signalling may be used to condition the second switching router 101, for example any of the signalling methods described above in connection with FIGS. 3 and 4.

The main difference between the embodiments of FIGS. 4 and 5 is that in the embodiment of FIG. 5, the switching router includes a discrete incoming label map for each LSP which shares the same port or routing device. In the example, the switching router includes additional label maps 111, 113 associated with the first routing device and which contain forwarding instructions for other label switched paths, LSPC and LSPD received by the first routing device 103. Similarly, the switching router 101 further includes additional discrete incoming label maps 115, 117 associated with the second routing device 105 containing forwarding information for other label switched paths LSPE, LSPF received by the second routing device 105. Advantageously, since each LSP has its own incoming label map, different LSPs can use the same flow label for different instructions.

In another embodiment, the secondary LSP which serves as an alternate path for the primary LSP may also be connected to the first routing device 103. In this case, one of the additional incoming label maps 111, 113 associated with the first routing device 103 may serve as the incoming label map for the secondary LSP. The secondary LSP incoming label map may be generated in a similar way used to generate the secondary incoming label map 109 associated with the second routing device 105.

Preferably, the status of data flows within the primary and/or secondary LSPs is regularly monitored and the incoming label maps for both the primary and secondary LSPs updated to reflect the current status so that any new data flows are added to the ILMs and any redundant data flows are removed from the ILMs.

In other embodiments, it may be unnecessary to take any special steps to condition the second switching router to associate the information concerning data flows within the primary LSP with the secondary LSP. For example, in one embodiment, the routing device which receives data packets carried on the second communication path may have been previously arranged to use the same incoming label map as used for the primary LSP. In this case, the secondary LSP may be automatically referenced to the primary LSP data flow information simply by virtue of establishing the secondary LSP. When the secondary LSP is established the second switching router is identified as the egress LER, as in this case, the secondary LSP set up signalling programs, by default, the second switching router to remove the LSP label. Accordingly, on receiving data packets contained within the secondary LSP, the second switching router would automatically remove the secondary LSP label so that the data packets are now identified only by their data flow labels which are already identified in the ILM associated with the receiving routing device.

In another embodiment, the secondary LSP may be arranged such that the switching router immediately preceding and adjacent to the egress LER is adapted not to add a secondary LSP forwarding label to the data packets. In this case, the data packets received by the egress LER would contain the data flow labels but not the secondary LSP forwarding label. In this case, if the ILM associated with the receiving routing device of the egress LER already contains the information for the data flows within the primary LSP, no special action is required to condition the egress LER (e.g. the second switching router in the present embodiment). Thus, one of the main purposes of adding the last secondary LSP forwarding label to the secondary LSP data packets is so that the egress LER can uniquely identify those data packets as being associated with primary LSP data flows.

The operation of the communication network in redirecting data traffic from the first communication path to the second communication path will now be described with reference to FIGS. 1B to 5.

Referring to FIG. 2, in general, in order to divert data traffic from the first communication path to the second communication path, the first switching router 3 is responsive to a signal to apply the forwarding label of the secondary LSP to incoming data packets for each data flow destined for the second switching router 5, rather than applying the forwarding label of the primary LSP. The steps required to redirect data traffic depends on whether the first router has been conditioned to re-route data traffic over the second communication path, and if so, how the first switching router 3 has been conditioned. The required steps to re-route data traffic over the second communication path also depends on whether the second switching router has been conditioned to receive re-routed data traffic, if conditioning is necessary. Examples of the steps to be taken by the first switching router, and if necessary by the second switching router, for both protection and restoration will be described below.

In the case of protection, where the first communication path is protected by the second communication path, the secondary LSP will have already been established between the first and second switching routers before switching to the secondary LSP is required. In addition, the first switching router will have been conditioned to be capable of applying the secondary LSP forwarding label to data packets and to output the data packets onto the second communication path. The second switching router will have been conditioned to be capable of handling data packets whether received within the primary LSP or the secondary LSP, for example as described above in connection with FIGS. 3 to 5. Thus, for protection, the steps to be taken by the first switching router to switch data traffic from the primary LSP to the secondary LSP depends on how the first switching router is set up to apply the secondary LSP forwarding label to data packets to be switched onto the secondary LSP.

In a first example, the first switching router has been previously conditioned to contain an incoming label map for the secondary LSP containing entries for each data flow contained within the primary LSP and a corresponding secondary LSP forwarding instruction, for example as shown in FIG. 2. In this case, when switching is required from the primary LSP to the secondary LSP, the switching requirement is signalled to the first switching router and the only action required by the first switching router is to respond by controlling the routing device to apply the secondary LSP incoming label map to incoming data packets rather than the primary LSP incoming label map. Thus, advantageously, with a single operation, the first switching router is enabled to switch data traffic for all of the primary LSP data flows onto the secondary LSP.

In a second example, the state of the first switching router prior to switching is that the secondary LSP has been established, but an incoming label map for the secondary LSP has not been created. In this case, when switching is required, a signal indicating the switching requirement is received by the first switching router which responds by changing the primary LSP forwarding instructions for each relevant entry in the incoming label map with the secondary LSP forwarding instructions. Once each entry has been changed, the first switching router is enabled to divert traffic for that entry onto the secondary LSP.

In the case of restoration, generally, the primary LSP will have been established prior to a switching requirement to divert traffic from the first communication path, but a secondary LSP will not have been established between the first and second switching routers, and the first switching router and, if necessary, the second switching router will not have been conditioned for transmitting and receiving, respectively, primary LSP data flows over the second communication path. Therefore, for restoration, when switching is required to divert data traffic from the primary LSP, a signal indicating the switching requirement is received by the first switching router which responds by (i) establishing a secondary LSP along a second communication path between the first and second switching routers, (ii) generating an incoming label map for the secondary LSP (which may involve simply updating the primary LSP entries with new forwarding information in the existing ILM or creating a separate secondary LSP ILM), (iii) if necessary, signalling the second switching router to reference the secondary LSP with the primary LSP by, for example, generating a secondary LSP incoming label map in the secondary switching router, or any other method described above in connection with FIGS. 3 to 5, as well as other methods.

Advantageously, with this small number of steps, most of which can be performed in parallel rather than successively, all data flows within the primary LSP can be restored, irrespective of the number of data flows within the primary LSP. This restoration technique significantly reduces the time to restore data traffic in the event of a fault of failure in the communication capability of the first communication path. A major benefit of this restoration technique over prior art techniques stems from the fact that the present restoration technique only requires a single LSP to be established when switching is required, regardless of the number of data flows or individual LSPs aggregated within the primary LSP, whereas in the prior art, separate LSPs would need to be established (i.e. redialled) for each data flow or individual LSP carried on the first communication path. For example, where the first communication path carries one thousand separate data flows or individual LSPs, the prior art would require one thousand new LSPs to be redialled, whereas the present restoration technique requires just one new LSP to be established, which takes a fraction of the time and demands fewer resources of the second communication path, since for example each intermediate label switching router need only process and store information for a single new LSP rather than one thousand new LSPs. Furthermore the performance of the restoration path is significantly improved over a prior art implementation and should be capable of achieving a level of performance similar to the primary LSP. This is primarily attributable to the fact that the restoration path serves as a "virtual trunk" capable of carrying any number of individual LSPs so that the forwarding table of each LSR contains a single forwarding instruction which is applicable to multiple LSPs, rather than a different forwarding instruction for each LSP. Therefore, since each LSR effectively treats different individual LSPs as a single LSP, the processing time required for forwarding data packets for different individual LSPs is significantly reduced.

In other embodiments of the present invention, the present switching technique can be used to switch data traffic from one path to another path whenever it is desirable to do so and for reasons other than protection and restoration. For example, embodiments of the present invention may be adapted to switch data traffic from one path to another path in response to another state of the first communication path, for example the density of traffic, and therefore embodiments of the present invention may be used for traffic engineering.

It is to be noted that the second communication path may share one or more of the same resources (e.g. switching router and/or communication link(s)) with the first communication path. Generally, the second communication path will have at least one communication element or resource which is different from the first communication path. In this way, the second communication path which does not share that resource or resources can be invoked to by pass and thereby protect data traffic if that or those resource(s) are to be circumvented.

Figure 6:
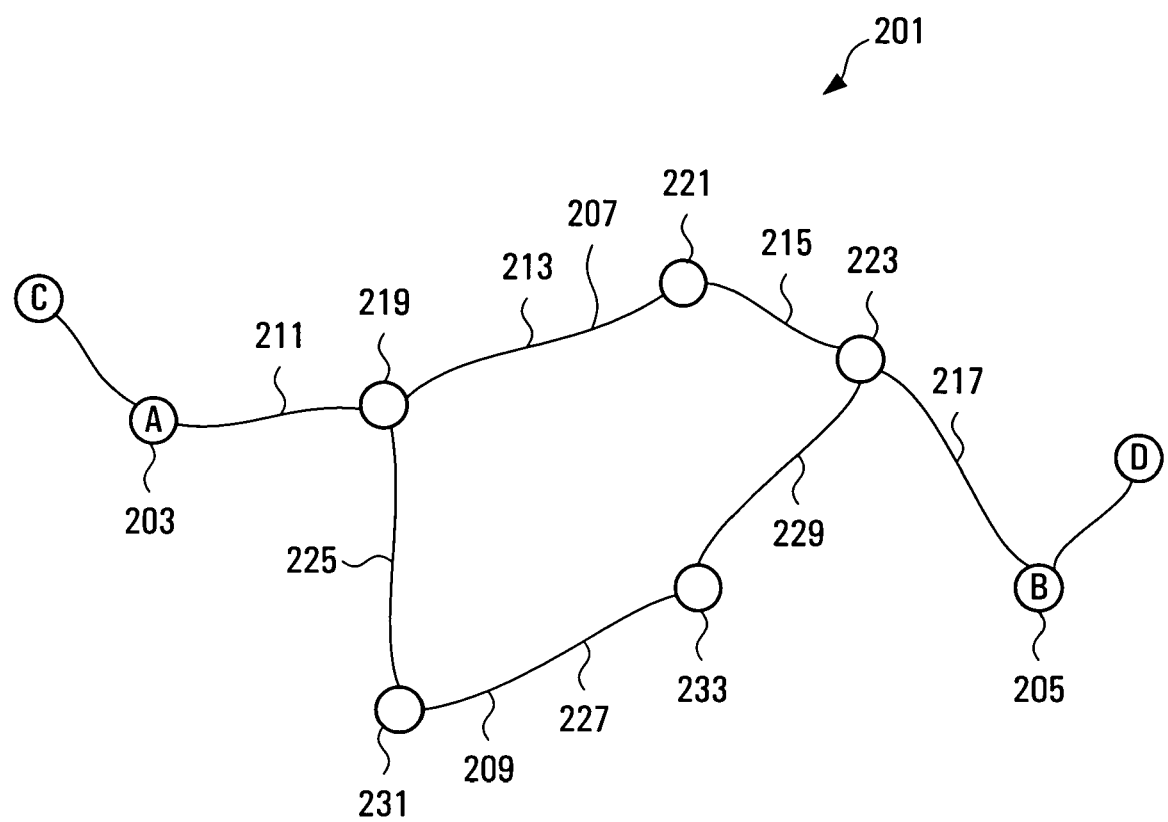
FIG. 6 shows a communication network in accordance with another embodiment of the present invention.

FIG. 6 shows an example of a communication network in accordance with an other embodiment of the present invention. Referring to FIG. 6, the communication network, generally shown at 201, includes first and second switching routers 203, 205 located at nodes A and B, respectively. Extending between the first and second switching routers 203, 205, the communication network includes a first communication path 207 which includes communication links 211, 213, 215 and 217 and intermediate switching routers 219, 221 and 223. The communication network also includes a second communication path 209 extending between nodes A and B, the second communication path including communication links 211, 225, 227, 229 and 217 and intermediate switching routers 219, 231, 233 and 223. Thus, in this embodiment, the first and second communication paths share the communication link 211 from the first switching router 203 to the adjacent intermediate switching router 219, the communication link 217 extending from the intermediate switching router 223 which immediately precedes the second switching router 205, and the second switching router 205 and the intermediate switching routers 219 and 223. A primary LSP is established on the first communication path and a secondary LSP is established on the second communication path, both extending between the first and second switching routers 203, 205 and may be established according to any of the methods described above in connection with FIGS. 1A to 5. The first and second switching routers may also be conditioned to switch data from the primary LSP to the secondary LSP or vice versa, again in accordance with any of the conditioning methods described above. In this case, the secondary LSP is capable of protecting data traffic against a fault or failure of any of the resources of the first communication path 207 which are not shared with the second communication path 209, namely communication links 213, 215 and intermediate switching router 221. Again, the secondary LSP may be invoked to carry data traffic for any other reason, for example to circumvent the unshared resources of the first communication path due to the volume of data traffic or any other status of the first communication path.

The first and second communication paths may include any number of communication links and intermediate switching routers between the source and destination routers, including a single communication link and no intermediate switching routers.

In another embodiment, the primary and secondary LSP may be used at the same time to carry data traffic. For example, the first switching router may be controlled to duplicate data packets for transmission to the second switching router, duplicate the associated flow label, to add the flow label and the primary LSP label to one data packet, to add the flow label and the secondary LSP label to the other data packet, and output the packets onto the respective first and second communication paths. The second switching router may be conditioned to select one or other of the data packets for further processing. In this case, if a fault or failure occurs in the transmission capability of a resource of one of the first and second paths which is not shared by the other communication path, data packets which were lost as a result of the fault or failure arrive at the second switching router via the active communication path, in which case the second switching router simply switches its selection of data packets, if necessary, from the inactive to the active LSP (i.e. primary or secondary LSP).

It is to be noted that, according to another aspect of the present invention, it is not necessary that a primary LSP is created for data flows on the first communication path. For example, in one embodiment, separate LSP's for each data flow are created on the first communication path. The forwarding label for each LSP is stored in the incoming label map associated with the first communication path at the second switching router. Knowledge of these forwarding labels is transmitted from the second router back to the first router which then generates an incoming label map containing this information for use in transmitting data packets, associated with each LSP using the first communication path, within the secondary LSP on the second communication path. In this way, the first switching router is capable of redirecting data packets associated with the various LSPs on the first communication path onto the second communication path without having to dial a new LSP for each first communication path LSP. To redirect the various LSP data packets, the first switching router simply applies the secondary LSP ILM to the LSP data packets and forwards the data packets with a flow label comprising the forwarding label for each LSP which would be received by the second switching router from the first communication path, and with the secondary LSP label. If necessary, the second switching router is conditioned to receive the various LSP data packets transmitted on the secondary LSP and to apply the appropriate forwarding instructions. For example, the secondary LSP forwarding label received by the second switching router may be associated with or referred to the incoming label map for the various LSPs which employ the first communication path. In another embodiment, data flows or LSP's carried on different communication paths between the first and second switching routers may be aggregated onto a single LSP, using the principles described above.

Figure 7:
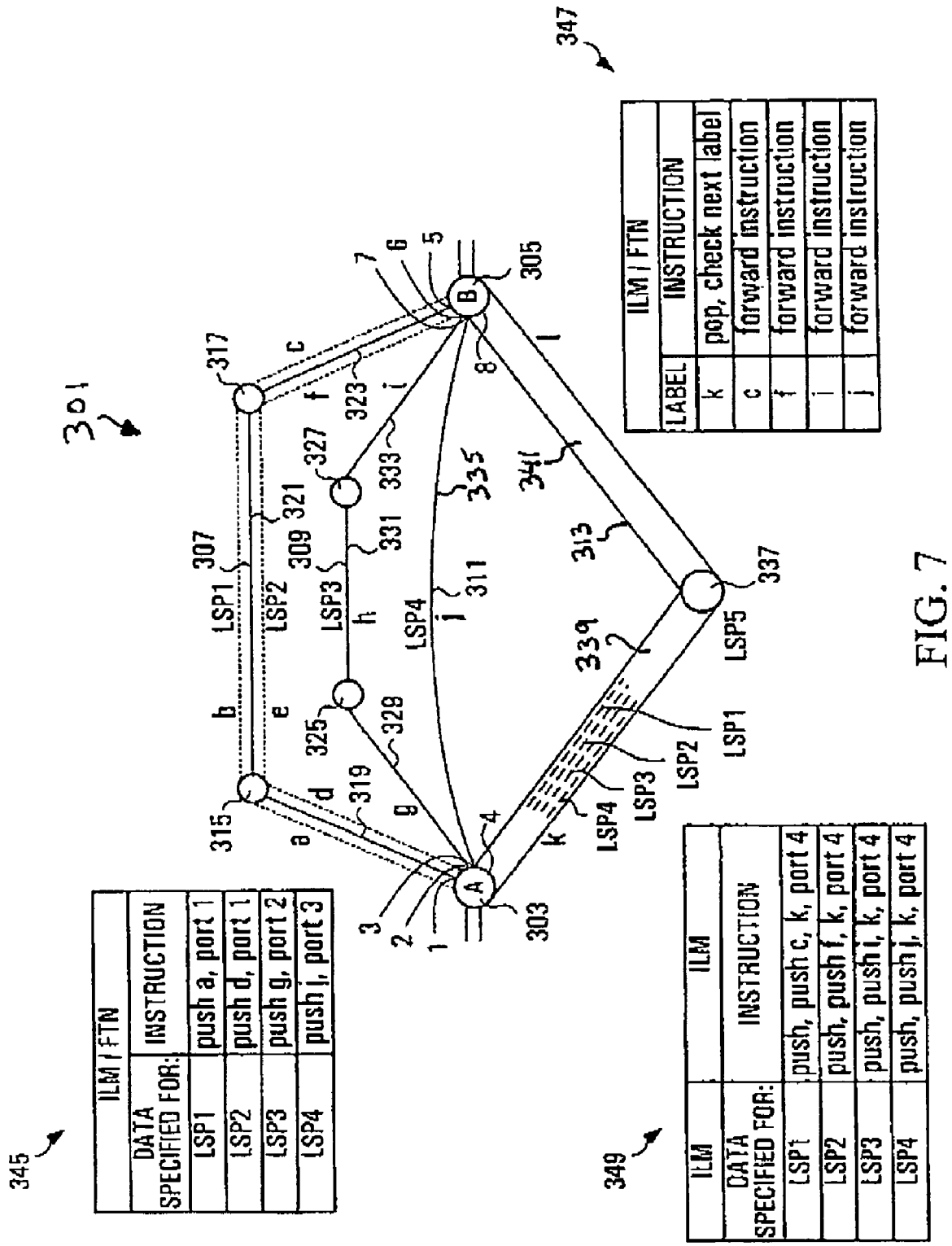
FIG. 7 shows a communication network in accordance with another embodiment of the present invention.

An example of an embodiment of this aspect of the present invention is shown in FIG. 7.

Referring to FIG. 7, a communication network, generally shown at 301, comprises a first switching router 303 at node A and a second switching router 305 at node B. The communication network 301 includes first, second, third and fourth communication paths 307, 309, 311 and 313 extending between the first and second switching routers 303, 305. The first communication path 307 includes intermediate nodes or switching routers 315, 317 and communication links 319, 321, 325; the second communication path 309 includes intermediate nodes or switching routers 325, 327 and communication links 329, 331, and 333; the third communication path 311 includes a single communication link 335 between the first and second switching routers, and the fourth communication path 313 includes an intermediate node or switching router 337 and communication links 339, 341.

In this example, first and second label switched paths LSP1, LSP2 are established on the first communication path 307, the first label switched path being defined by successive flow or forwarding labels a, b, c, and the second label switched path being defined by successive flow or forwarding labels d, e and f. A third label switched path LSP3 is established on the second communication path 309 and is defined by successive flow or forwarding labels g, h and i. A fourth label switched path LSP4 is established on the third communication path 311 and is defined by flow or forwarding label j, and a fifth label switched path LSP5 is established on the fourth label switched path 313 and is defined by successive flow or forwarding labels k and l.

The first switching router 303 has a first incoming label map or forwarding table 345 for enabling the first switching router to direct data which is predetermined for transmission on the first label switched path, onto the first communication path 307 from port 1 with the forwarding label a. Similarly, the incoming label map 345 enables the first switching router 303 to direct data which is predetermined for transmission on the second label switched path LSP2, onto the first communication path from port 1 with the forwarding label d defining the second LSP. The ILM 345 also contains entries which enable the first switching router to direct data which is predetermined for transmission on the third and fourth LSP's, LSP3 and LSP4, onto the second and third communication paths 309, 311, respectively from respective output ports 2, 3 and with the respective forwarding labels g and j.

The second switching router 305 has an incoming label map (ILM) or forwarding table 347 which includes an entry for each of the first, second, third and fourth LSP's, each entry including a record of the flow or forwarding label c, f, i, j used to define and identify each of the first, second, third and fourth LSP's to the second switching router, and a forwarding instruction associated with each label.

The communication network is conditioned by transmitting or otherwise providing to the first switching router knowledge or information concerning the flow labels c, f, i and j for receipt by the second switching router and which define each of the first, second, third and fourth label switched paths. In this embodiment, a third incoming label map or forwarding table 349 is created which contains an entry for the data which is predetermined for transmission on each of the first to the fourth label switched paths. However, in contrast to the first incoming label map 345, the third incoming label map 349 is operative to label data which is predetermined for transmission on each of the first to the fourth LSP's with the forwarding label defining the respective LSP which would be received by the second switching router. For example, for data which is predetermined for transmission on the first LSP, LSP1, the third incoming label map 349 causes the first switching router to include forwarding label c with the data rather than forwarding label a, where forwarding label c is the forwarding label of the first LSP which would be received by the second switching router from the first communication path 307. Similarly, the ILM 349 enables the first switching router 303 to include with data which is predetermined for transmission on the second LSP, LSP2, the forwarding label f, rather than the forwarding label d, where forwarding f is the forwarding label defining the second LSP which is received with LSP2 data by the second switching router 305 from the first communication path.

The third ILM 349 further enables the first switching router to include with data which is predetermined for transmission on each of the first, second, third and fourth LSP's the forwarding label k defining the fifth LSP on the fourth communication path 339 and to output the data onto the fourth communication path from port 4 of the first switching router. In this way, the first switching router is able route or re-route data which is predetermined for transmission on one or more of the first, second, third and fourth LSP's established on the respective first, second and third communication paths, onto the fourth communication path, and to place one or more of these data flows within the fifth LSP. The second switching router is conditioned, if necessary, to correlate data which is received from the fourth communication path on port 8 of the second switching router with the entries contained in the second ILM 347. In the present embodiment, this is implemented by including an entry in the second ILM 347 instructing the second switching router for data containing the forwarding label 1 received at port 8 to remove this label and read the next label. As the flow labels c, f, i, and j used to identify data associated with each of the first, second, third and fourth LSP's to the second switching router are carried with the data on the fourth communication path within the fifth LSP, the second ILM 347 already contains the necessary entries to enable the second switching router to forward data associated with each LSP carried within the fifth LSP on the fourth communication path. Advantageously, this arrangement obviates the need for dialling or establishing alternative LSP's along an alternative path for each data flow when routing data along an alternative path is required, for example for restoration or traffic engineering, as well as other reasons.

It is also to be noted that for any of the embodiments described above, as well as other embodiments, it is unnecessary that the flow label associated with predetermined data transmitted on the second or alternative communication path is the same as the flow label associated with that predetermined data for transmission on the first communication path. For example, in embodiments where a particular data flow is to be carried within a primary LSP on the first communication path or a secondary LSP on the second communication path, the data which is predetermined for that data flow may be forwarded from the first switching router with a first flow label for the data flow within the primary LSP and with a second, different flow label for the data flow within the secondary LSP. In this case, knowledge of both the first and second flow labels or the relationship between the first and second flow labels is required by the second switching router so that it can associate the predetermined data with the appropriate instruction if the predetermined data is received with the first flow label on the primary LSP, or if the predetermined data is received with the second flow label on the secondary LSP. In the case where predetermined data is to be carried on a data flow which itself may be a labelled switched path but is not placed within another label switched path, but when carried on the second communication path the data flow is carried within a secondary LSP, as described above in connection with FIG. 7, again, the data flow label output with the predetermined data for the data flow on the secondary LSP may be different from the flow label which is received for that predetermined data by the second switching router on the first communication path. Again, the second switching router requires knowledge of the first and second flow labels or the relationship between the flow labels received with the predetermined data on the first and second communication paths so that it can associate the data with the appropriate instruction.

As mentioned above, preferably the state of the or each data flow within the primary LSP is regularly monitored and maintained by both the first and second switching routers. In one embodiment, refresh messages are transmitted from the first switching router to the second switching router to refresh their state information relating to each data flow. The state, which may also be referred to as "soft-state", may include time remaining before incoming label map/forwarding table entries expire and bandwidth consumed. In the case of time remaining before forwarding table entries are set to expire, a timer is set for each forwarding table entry, and if the timer expires the entry is deleted. Preferably, all soft state information for the primary LSP data flows are also maintained for the secondary LSP data flows.

In one embodiment, state information is created and state machines are started for each data flow within the primary LSP, and the same state information is created and state machines started for each data flow for the secondary LSP. Thus, any state change in the data flows in the primary LSP is reflected in the data flows of the secondary LSP. There are a number of different methods in which the soft state can be maintained for both the primary and secondary LSP micro flows at the second switching router, examples of which will be described below.

In one embodiment, where both primary and secondary LSPs share the same forwarding table, only one state machine and state information base is required to serve that forwarding table. If the primary LSP fails so that data traffic is redirected over the secondary LSP, the state of each primary LSP data flow is preferably maintained unchanged by the absence of refresh messages, until the secondary LSP is established.

In another embodiment, refresh messages are duplicated and sent over both the primary and secondary LSPs. The second switching router determines which of the duplicated messages received over the primary and secondary LSP to use in refreshing the state information base. For example, the second switching router may use only those refresh messages received over the primary LSP. If the primary path fails, the second switching router may then use refresh messages received from the secondary LSP. The state of each primary LSP data flow may be maintained unchanged, even in the presence of refresh messages on the secondary LSP, until the switch over of data from the primary to the secondary LSP is complete.

In another embodiment, on receipt of a refresh message on the primary LSP, the state information is copied to the secondary LSP. When the secondary LSP is invoked, refresh messages are sent over the second communication path. In the example described above in connection with FIGS. 1 to 5, where two data flows exist within the primary LSP, identical machines and state information may be created for the secondary LSP. In one embodiment, a forwarding entry timer may be provided for each entry for each of the primary and secondary LSP's, and in another embodiment, a single forwarding entry timer may be provided for both data flow entries in the primary LSP and another forwarding entry timer may be provided for both data flow entries in the secondary LSP. When a refresh message arrives at the second switching router, the forwarding entry timers are reset. If the primary LSP fails and a secondary LSP dialled, the micro flow state is preferably maintained unchanged by the absence of refresh messages until the secondary LSP is established.

References as contained herein to a router routing data onto a communication path simply means that the router switches or directs data onto a communication path, and does not imply that any particular method of classifying or switching data which may be associated in the art with the term "route" or "routing" is to be used.

Embodiments of the present invention may be applied to a communication network which employs any data transmission medium, including wire and optical fibre as well as others.

Numerous modifications and changes to the embodiments described above will be apparent to those skilled in the art.

The invention claimed is:

1. A method of path restoration in a communication network having a first switching router and a second switching router, first and second communication paths extending between said first and second switching routers, said second communication path including at least one communication path element different from said first communication path, the method comprising steps of:
    creating a first label switched path on said first communication path;
    placing one or more data flows within said first label switched path;
    creating a second label switched path on said second communication path;
    associating said second label switched path with said first label switched path so as to identify said second label switched path as an alternative path for said first label switched path;
    transferring knowledge of said one or more data flows within said first label switched path to said second label switched path; and
    redirecting data flows destined for said first switched path to said second label switched path;
    wherein said step of creating a second label switched path comprises said step of associating said second label switched path and further comprises a step of sending a set up signal to said second switching router, said set up signal having a extra data field identifying the first label switched path;
    wherein the step of transferring knowledge further comprises transferring a soft state of each said one or more data flows; and
    wherein each said first and second switching routers have an incoming label map for each said first and second label switched paths and the step of transferring knowledge comprises a step of copying entries from the incoming label map of said first label switched path to the incoming label map of said second label switched path.

2. A method as claimed in claim 1, wherein said step of redirecting said data flows comprises a single step of switching from said first label switched path to said second label switched path.

3. A method as claimed in claim 1, wherein said step of sending a set up signal creating a second label switched path comprises an RSVP signalling method and the data field identifying the first label switched path is sent as an opaque object.

4. A method as claimed in claim 1, wherein said step of sending a set up signal creating a second label switched path comprises a CR-LDP signalling method and the data field identifying the first label switched path is sent as an opaque TLV (Type Length Value).

5. A method as claimed in claim 1, wherein the step of creating a second label switched path occurs before the step of placing one or more data flows within said first label switched path.

6. A method as claimed in claim 1, wherein the step of creating a second label switched path occurs after said change of state.

7. A method as claimed in claim 1, further comprising a step of monitoring a state of data transmission associated with said first and second communications paths and wherein said step of redirecting flows is responsive to a change of state of at least one of said first and second communications paths.

8. A method as claimed in claim 7, wherein said step of redirecting flows is responsive to at least one of a fault or failure in the transmission capability of said first communication path and the density of data transmitted on said first communication path.

9. A method as claimed in claim 1, wherein said first and second switching routers each have at least one incoming label map containing instructions for incoming data flows, said data flows being represented by corresponding flow labels, and wherein said step of transferring knowledge is performed on a regular basis.

10. A method as claimed in claim 1, wherein said step of transferring knowledge is accomplished by said first and second label switched paths sharing an incoming label map.

11. A router for routing data onto a network having a network node and first and second communication paths extending from said router to said network node, said second communication path including at least one communication path element different from said first communication path, said router comprising:
    first routing means for routing a first label switched path onto said first communication path;
    second routing means for routing a second label switched path onto said second communication path;
    set up means for setting up said first and second label switched paths;
    associating means for associating said second label switched path with said first label switched path so as to identify said second label switched path as an alternative path for said first label switched path;

transferring means for transferring knowledge of said one or more data flows within said first label switched path to said second label switched path; and redirecting means for redirecting flows destined for said first switched path to said second label switched path;

wherein said associating means is configured to associate said second label switched path with said first label switched path by sending in a set up signal for said second label switched path, an extra data field identifying said first label switched path;

wherein the transferring means further comprises means for transferring a soft state of each said one or more data flows; and wherein each said first and second routing means have an incoming label map for each said first and second label switched paths and the transferring means comprises means for copying entries from the incoming label map of said first label switched path to the incoming label map of said second label switched path.

12. A router as claimed in claim 11, wherein said associating means is configured to use an RSVP signaling method and send the extra data field as an opaque object.

13. A router as claimed in claim 11, wherein said associating means is configured to use a CR-LDP signalling method and send the extra data field as opaque TLV (Type Length Value).

14. A router as claimed in claim 11, wherein said redirecting means is responsive to a change of state of data transmission associated with at least one of said first and second communications paths.

15. A router as claimed in claim 14, wherein said redirecting means is responsive to at least one of a fault or failure in the transmission capability of said first communication path and the density of data transmitted on said first communication path.

* * * * *